(12) United States Patent
Yazawa

(10) Patent No.: US 7,372,671 B2
(45) Date of Patent: May 13, 2008

(54) DISK APPARATUS

(75) Inventor: Hisayuki Yazawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 525 days.

(21) Appl. No.: 11/021,233

(22) Filed: Dec. 21, 2004

(65) Prior Publication Data

US 2005/0141140 A1 Jun. 30, 2005

(30) Foreign Application Priority Data

Dec. 26, 2003 (JP) ............................. 2003-432965

(51) Int. Cl.
*G11B 5/55* (2006.01)
(52) U.S. Cl. .................................. 360/265.9
(58) Field of Classification Search ............. 360/265.9, 360/264.4, 264.5, 265.7, 266, 294.1, 245.1, 360/244.5, 244.9, 244.8, 266.1; 369/184, 369/215.1, 222, 244.1, 250; 720/658, 662
See application file for complete search history.

(56) References Cited

U.S. PATENT DOCUMENTS

| | | | | |
|---|---|---|---|---|
| 4,722,080 A | * | 1/1988 | Dieckmann | 369/254 |
| 4,994,931 A | * | 2/1991 | Foote | 365/106 |
| 5,805,388 A | * | 9/1998 | Engwall | 360/266 |
| 6,088,194 A | * | 7/2000 | Imaino et al. | 360/294.3 |
| 6,574,072 B1 | * | 6/2003 | Batra | 360/125 |
| 6,775,106 B1 | * | 8/2004 | Williams et al. | 360/265.9 |
| 7,072,147 B2 | * | 7/2006 | Limmer et al. | 360/264.1 |
| 7,151,649 B2 | * | 12/2006 | Boutaghou et al. | 360/264.1 |
| 2003/0081356 A1 | * | 5/2003 | Shimizu et al. | 360/265.9 |
| 2005/0180056 A1 | * | 8/2005 | Shimizu et al. | 360/265.9 |

FOREIGN PATENT DOCUMENTS

| | | |
|---|---|---|
| JP | A-59-28216 | 2/1984 |
| JP | A-6-111505 | 4/1994 |
| JP | A-2001-101633 | 4/2001 |

* cited by examiner

*Primary Examiner*—Brian E. Miller
*Assistant Examiner*—Matthew G. Kayrish
(74) *Attorney, Agent, or Firm*—Brinks Hofer Gilson & Lione

(57) ABSTRACT

A head beam is retained at a front portion of the pivoting arm so as to be rotatable, and is continuously urged by an urging member in the counterclockwise direction. The pivoting arm has a directing rod rotating around a supporting shaft. A slidable projection of the directing rod is slidably in contact with a beam rod, and a fixed supporting point is also slidably in contact with the directing rod. Accordingly, when the pivoting arm rotates, the operational reference line of the magnetic head is oriented along the tangential direction. Due to continuous urging force by the urging member, the direction of the magnetic head is continuously stabilized.

34 Claims, 6 Drawing Sheets

DISK APPARATUS

This application claims the benefit of Japanese Patent Application 2003-432965, filed on Dec. 26, 2003, which is incorporated herein by reference.

FIELD

The present application relates to disk apparatuses for reading and writing information by driving hard disks such as magnetic disks, magneto-optical disks, and disks in other forms, and in particular, relates to a disk apparatus capable of orienting an operational reference line of the head substantially along the tangential direction to the disks.

BACKGROUND

Description of the Related Art

FIG. 6 is a plan view illustrating the structure of a disk apparatus according to a related art. This disk apparatus, into which a hard disk D is loaded, includes rotating means 1 rotating the hard disk D, and a head 2 opposing an information-recording surface of the hard disk D. The head 2 has a slider that floats by airflow over the disk surface generated by rotation of the hard disk D, and has a recording element and a reading element disposed at the trailing surface of the slider.

The head 2 is supported at the tip of a load beam 3, and the load beam 3 is fixed at a front portion of a pivoting arm 4. A base portion 5 of the pivoting arm 4 is retained by a supporting shaft 6 so as to be rotatable. The pivoting arm 4 is rotated by an actuator (not shown).

The direction along which magnetic poles oppose each other in the recording element of the head 2 is defined as an operational reference line L. In FIG. 6, a reference position (i) of the pivoting arm 4 when the operational reference line L is oriented along the tangential direction to an actual recording track is illustrated with solid lines. When the pivoting arm 4 rotates clockwise by an angle α from the reference position (i) to an outer circumferential position (ii), the head 2 opposes a track at the outermost circumference of the hard disk D. When the pivoting arm 4 rotates counterclockwise by an angle β from the reference position (i) to an inner circumferential position (iii), the head 2 opposes a track at the innermost circumference of the hard disk D.

However, when the pivoting arm 4 rotates clockwise or counterclockwise from the reference position (i), the operational reference line L of the head 2 tilts from the tangential line to the recording tracks. The tilt angle is maximized when the head 2 is at the outer circumferential position (ii) after the clockwise rotation, and when the head 2 is at the inner circumferential position (iii) after the counterclockwise rotation.

When the operational reference line L of the head 2 tilts from the tangential line to the recording track, the recording element or the reading element disposed on the head 2 is inclined with respect to the normal line to the recording track, and this adversely affects reading and writing. In particular, when the head 2 includes a recording element of a perpendicular magnetic recording type, the actual magnetic recording width is larger than the track width to be recorded (fringing). This fringing increases cross talk during reading.

The following patent documents disclose various adjusting apparatuses for aligning the operational reference line L of the head 2 parallel to the tangential direction to the recording track when the pivoting arm 4 rotates.

In Japanese Unexamined Patent Application Publication No. 2001-101633, a head slider is attached to a suspension that corresponds to the load beam 3 in FIG. 6 through piezoelectric elements. The head slider is inclined with respect to the suspension by the driving force of the piezoelectric elements to reduce the tilt angle.

In Japanese Unexamined Patent Application Publication No. 59-28216, a magnetic head is attached to a front portion of a link unit including two pairs of linked rods that form a parallelogram. The magnetic head is oriented along the tangential line to the recording track by applying a pivoting force to the link unit.

In Japanese Unexamined Patent Application Publication No. 6-111505, a leading gear rotating together with a load beam is disposed at a front portion of a carriage that corresponds to the pivoting arm 4 in FIG. 6, a carriage gear is disposed at a base portion of the carriage, and an intermediate gear is disposed on the carriage so as to mesh with both the leading gear and the carriage gear. In this patent document, the load beam rotates in the opposite direction to the rotating direction of the carriage to reduce the tilt angle.

However, in Japanese Unexamined Patent Application Publication No. 2001-101633, driving control of the piezoelectric elements that change the direction of the head slider is complicated. Moreover, the inclination and direction of the head slider need to be controlled by driving the piezoelectric elements while the rotating direction of the suspension is monitored. This control operation is complicated and overloads circuits.

In Japanese Unexamined Patent Application Publication No. 59-28216, the magnetic head is transferred by means of the link unit that is formed of the two pairs of the linked rods. These rods need to be supported so as to be rotatable and need a large number of parts. Moreover, the link unit needs a large space to arrange the pairs of the rods so as to be parallel to each other without overlapping, and thus is difficult to be reduced in size.

In Japanese Unexamined Patent Application Publication No. 6-111505, the engagement of the gears produces backlashes. Due to the backlashes, the head position is not stabilized during reading and writing to complicate accurate tracking. Furthermore, a current hard-disk apparatus equipped with a small-diameter hard disk has a small carriage and a small load beam. This structure needs significantly small gears having small teeth, and is substantially impracticable as a real mechanism.

SUMMARY

By way of introduction only, in one aspect the disk apparatus includes rotating means for rotating a disk; a head opposing an information-recording surface of the disk; an arm pivoting around a base portion to move the head between the inner and outer circumferences of the disk; an actuator operating the arm; a rotatable head beam supporting the head and retained at a front portion of the arm; an urging member for urging the head beam in one direction; and a directing member disposed above the arm and rotating around an intermediate portion disposed at a midpoint between the base portion and the front portion. The directing member includes a first segment extending from the intermediate portion toward the head, and a second segment extending from the intermediate portion toward the base portion. The urging force by the urging member is applied to the first segment through the head beam to rotate the directing member in the opposite direction to the head beam. The second segment is sustained by a fixed supporting point other than the arm.

This simplified structure of the disk apparatus having the arm provided with the rotatable directing member can remove or reduce the tilt angle of the head. Moreover, since the urging force is applied to the head beam in one direction and is transmitted to the directing member, backlashes both between the arm and the head beam and between the arm and the directing member can be removed, and the head position can be stabilized during reading and writing.

Moreover, the continuous urging force by the urging member is applied to the directing member through the head beam when the arm rotates both clockwise and counterclockwise from a reference position in which an operational reference line of the head is oriented along the tangential direction to a track of the information-recording surface of the disk.

As described above, by continuously urging the head beam in one direction, the operational reference line of the head can be oriented along the tangential direction to the track at any rotational positions of the arm.

Furthermore, the head beam is in contact with the first segment of the directing member so as to be slidable, and the second segment of the directing member is in contact with the fixed supporting point so as to be slidable.

As described above, when the head beam is in contact with the directing member and the directing member is in contact with the fixed supporting point, link mechanisms for these members are unnecessary, and a small, lightweight, and easy-to-operate head beam can be produced.

According to one embodiment, the disk is a magnetic disk, and the head is useful for those including a magnetic pole and a return path for perpendicular magnetic recording on the magnetic disk. The disk apparatus can remove or reduce the tilt angle to control fringing during writing.

In another embodiment, a disk apparatus contains a head; a rotatable head beam supporting the head; an arm retaining the head beam; a non-moving supporting shaft around which the arm pivots; and means for maintaining a constant orientation of the head independent of a position of the arm.

In another embodiment, a disk apparatus contains a head; a rotatable head beam supporting the head; an arm pivotable around a base portion, a front portion of the arm retaining the head beam; a set of rods disposed above the arm, a first of the rods fixed at the base portion of the arm, a second of rods rotatable and disposed over an intermediate portion of the arm, and a third of the rods fixed to the head beam at the front portion of the arm, the rods disposed such that the arm and second rod rotate in a first direction while the third rod rotates in a second direction in opposition to the rotation of the arm and second rod; and a resilient member that applies a force to the second rod such that when the arm rotates backlash to the head beam is minimized.

In another embodiment, a disk apparatus contains a head; a rotatable head beam supporting the head; an arm pivotable around a base portion, a front portion of the arm retaining the head beam; and a multi-part suspension disposed above the arm that compensates for pivoting of the arm such that an orientation of the head is maintained substantially constant independent of a position of the arm while backlash to the head beam is minimized when the arm rotates.

Accordingly, the disk apparatus can eliminate or reduce the tilt angle of the head by means of a small and simplified structure, and furthermore, can eliminate backlash during operation to stabilize the head position during reading and writing.

DETAILED DESCRIPTION

Figure 1:
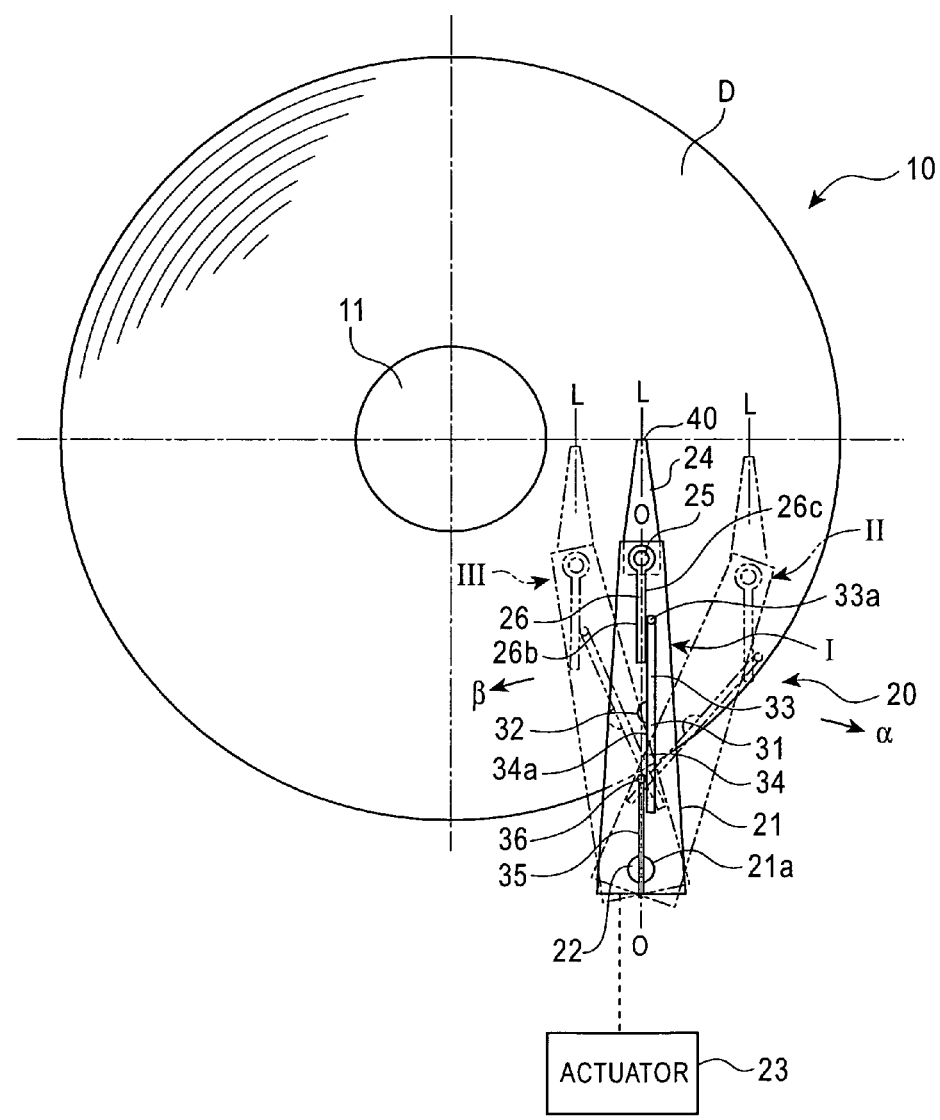
FIG. 1 is a plan view illustrating a principal portion of a hard-disk apparatus according to an embodiment of the present invention.

A hard-disk apparatus 10 shown in FIG. 1, into which a hard disk D of a perpendicular magnetic recording type is loaded, includes rotating means 11 provided with a spindle motor for rotating the hard disk D, and a head-driving device 20.

Figure 2:
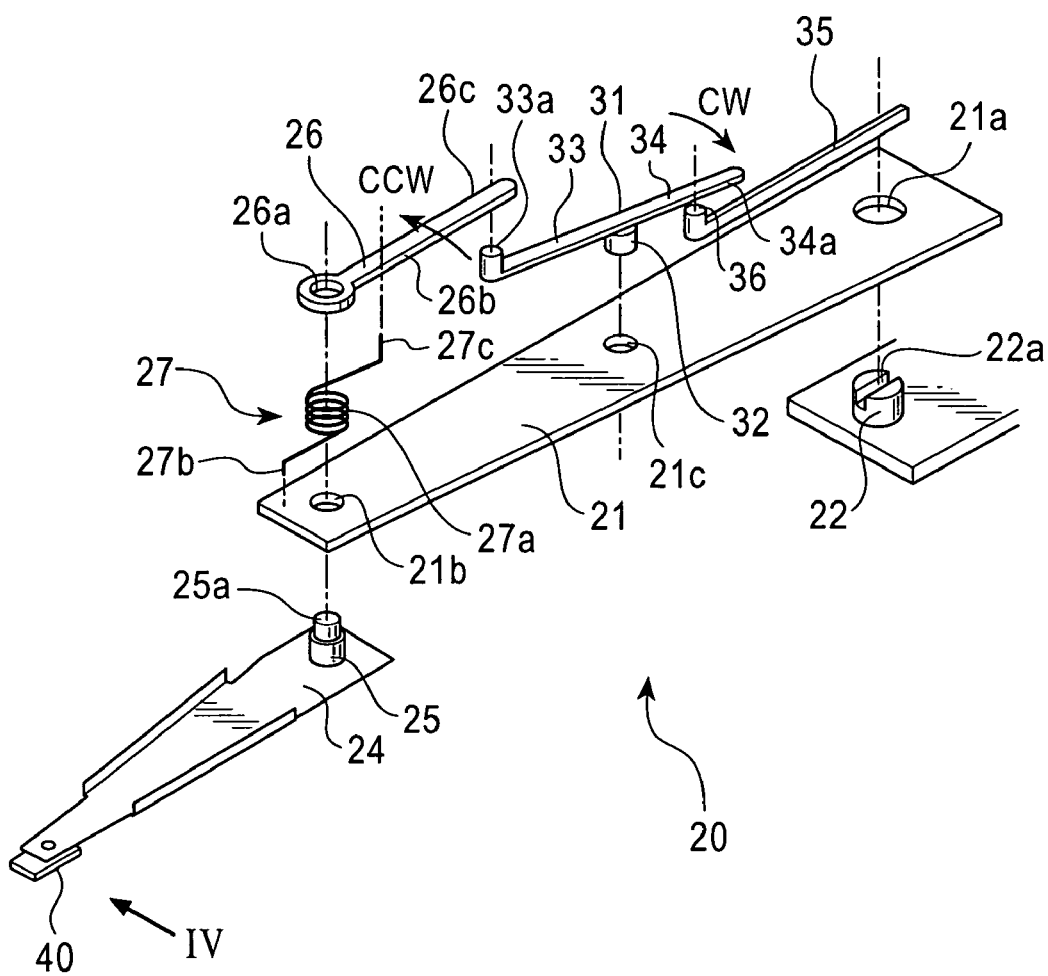
FIG. 2 is an exploded perspective view of a head-driving device installed in the hard-disk apparatus.

As shown in FIG. 2, the head-driving device 20 includes a pivoting arm 21. This pivoting arm 21 has a base hole 21a at a base portion, and a supporting shaft 22 formed on a fixed portion is fitted into the base hole 21a such that the pivoting arm 21 is rotatable around the supporting shaft 22. The head-driving device 20 includes an actuator 23 shown in FIG. 1. This actuator 23 has a coil fixed at the base end of the pivoting arm 21, and a magnet disposed at the fixed portion for providing a magnetic field to the coil. According to current applied to the coil and the magnetic field generated by the magnet, the pivoting arm 21 rotates within a range shown in FIG. 1.

The pivoting arm 21 has a front hole 21b at a front portion that supports a head beam 24. The head beam 24, which is referred to as a load beam, is composed of an elastically deformable plate spring. The head beam 24 has a magnetic head 40 attached to a front portion, and a link shaft 25 fixed on a base portion.

A beam rod 26 that is a part of the head beam 24 is disposed above the pivoting arm 21. The beam rod 26 has a link hole 26a at a front portion. The link shaft 25 fixed on the base portion of the head beam 24 passes through the front hole 21b so as to be rotatable, and a link portion 25a at a top portion of the link shaft 25 protrudes from the pivoting arm 21. The link portion 25a passes through the link hole 26a, and is fixed to the beam rod 26 by caulking, welding, bonding or some other means. As a result, the beam rod 26 can rotate around the link shaft 25 together with the head beam 24.

A coiling portion 27a of a torsion spring 27 functioning as an urging member is attached to the outer circumference of the link shaft 25 above the pivoting arm 21. A first arm 27b of the torsion spring 27 is retained on the pivoting arm 21, and a second arm 27c is fixed at a first side 26b of the beam rod 26. The beam rod 26 is continuously urged to rotate counterclockwise (CCW) due to the restoring force of the torsion spring 27. Consequently, the head beam 24 is also urged to rotate counterclockwise around the link shaft 25.

The pivoting arm 21 has an intermediate hole 21c at an intermediate portion, i.e. at the midpoint between the base hole 21a and the front hole 21b. A slender directing rod 31 is disposed above the pivoting arm 21. The directing rod 31 has a supporting shaft 32 fixed thereto, and the supporting shaft 32 is retained in the intermediate hole 21c so as to be rotatable.

The directing rod 31 is formed of a first arm (first segment) 33 linearly extending from the supporting shaft 32 to a front portion adjacent to the magnetic head 40, and a second arm (second segment) 34 linearly extending from the supporting shaft 32 to a base portion adjacent to the base hole 21a.

The first arm 33 has a slidable projection 33a integrally formed at a front portion, and the slidable projection 33a is in contact with a second side 26c of the beam rod 26 so as to be slidable. The second side 26c of the beam rod 26 is the opposite side of the first side 26b at which the second arm 27c of the torsion spring 27 is fixed.

The supporting shaft 22 protrudes upward from the base hole 21a of the pivoting arm 21. A fixing groove 22a is formed on a top portion of the supporting shaft 22 to lock a fixed rod 35 therein above the pivoting arm 21. The fixed rod 35 has a fixed supporting point 36 projecting upward from a front portion, and the fixed supporting point 36 is slidably in contact with a side 34a of the second arm 34.

As shown in FIG. 1, the slidable projection 33a formed on the first arm 33 of the directing rod 31 is in contact with the second side 26c at the right side of the beam rod 26, and the side 34a at the left side of the second arm 34 of the directing rod 31 is in contact with the fixed supporting point 36. The fixed supporting point 36 does not move regardless of rotation of the pivoting arm 21. Accordingly, when the beam rod 26 is urged in the counterclockwise direction by the restoring force of the torsion spring 27, the urging force transmitted from the first side 26b toward the slidable projection 33a urges the directing rod 31 to rotate clockwise (CW) around the supporting shaft 32, and this urging force presses the side 34a of the second arm 34 against the fixed supporting point 36.

The torsion spring 27 continuously urges the beam rod 26 wherever the pivoting arm 21 is located, as shown in FIG. 1. As a result, the beam rod 26 and the head beam 24 linked to the beam rod 26 through the link shaft 25 are retained without backlash, and the directing rod 31 is also retained without backlash.

The position of the fixed supporting point 36 is determined such that the fixed supporting point 36 does not obstruct the rotation of the pivoting arm 21. The fixed supporting point 36 is not necessarily formed on the fixed rod 35 that is fixed to the supporting shaft 22, and may be disposed at any position of the fixed portion in the hard-disk apparatus 10.

Figure 4A:
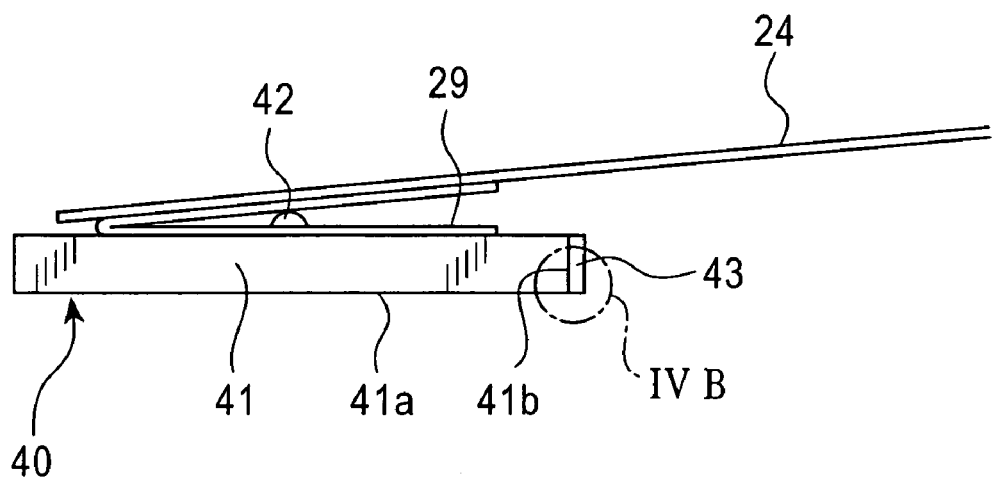
FIG. 4A is a side view of a magnetic head shown from the direction of an arrow IV in FIG. 2.

As shown in FIG. 4A, the magnetic head 40 includes a slider 41. A gimbal 29 composed of a thin plate spring is disposed between the top surface of the slider 41 and the bottom surface of the front portion of the head beam 24. The slider 41 is supported by the gimbal 29 so as to tilt to various directions relative to a pivot 42 that functions as a supporting point.

An air bearing surface (ABS) 41a of the slider 41 opposes an information-recording surface of the hard disk D. The slider 41 has a recording element 43 and a reading element that utilizes magnetoresistive effect at a trailing surface 41b.

Figure 4B:
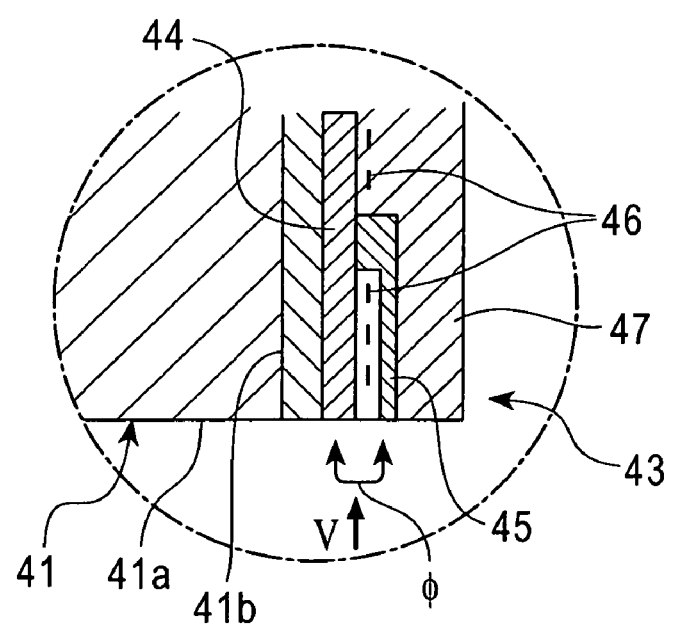
FIG. 4B is a partly enlarged view of FIG. 4A.

FIG. 4B is a partly enlarged view of the recording element 43, while the reading element is not shown. The recording element 43 is of a perpendicular magnetic recording type, and includes a return path 44 composed of a magnetic material, a magnetic pole 45 opposing this return path 44, and coil patterns 46 generating a recording magnetic field in the return path 44 and the magnetic pole 45. When the coil patterns 46 are energized, a magnetic field $\phi$ is generated in the magnetic pole 45, the return path 44, and a magnetic-path film formed as an internal layer of the information-recording surface of the hard disk D. The information-recording surface is perpendicularly magnetized by this magnetic field $\phi$ to record information.

Figure 5A:
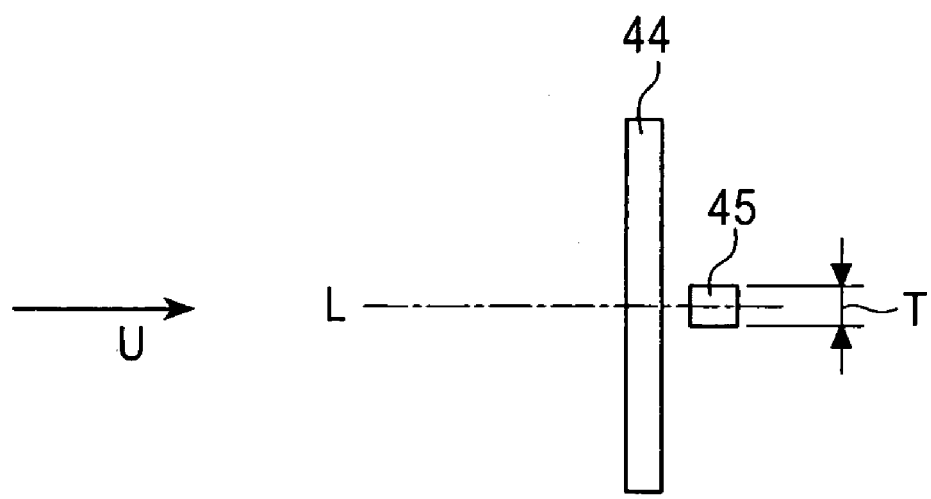
FIG. 5A illustrates an operational reference line of the magnetic head and the tangential direction to a recording track.
Figure 5B:
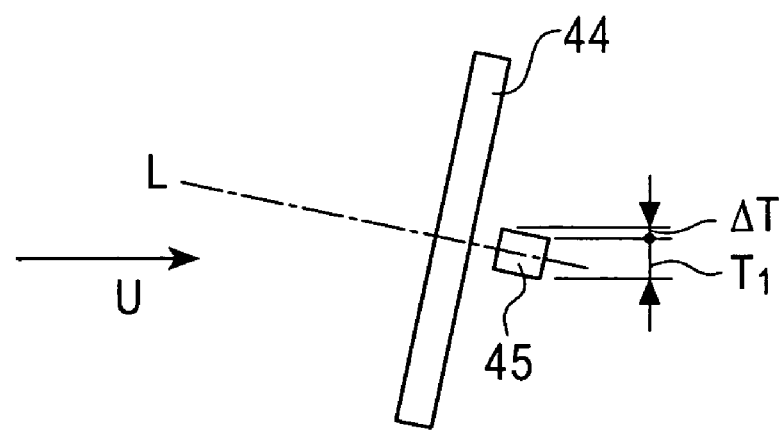
FIG. 5B illustrates the operational reference line tilting from the tangential direction.

FIGS. 5A and 5B are bottom plan views of the return path 44 and the magnetic pole 45 shown from the side of the hard disk D (the direction of an arrow V shown in FIG. 4B). A track width T of the recording element 43 corresponds to a side length of the magnetic pole 45 that opposes the return path 44. A virtual line dividing the track width T into equal halves and extending along a direction in which the return path 44 and the magnetic pole 45 oppose each other is defined as an operational reference line L of the magnetic head 40.

The arrows U shown in FIGS. 5A and 5B are the tangential direction to a recording track on the information-recording surface of the hard disk D. In FIG. 5A, the operational reference line L is aligned parallel to the tangential direction U, whereas in FIG. 5B, the operational reference line L is not aligned parallel to the tangential direction U, and a tilt angle is defined by the operational reference line L and the tangential direction U.

As shown in FIG. 5A, when the track width T is orthogonal to the tangential direction U, i.e. the tilt angle is substantially zero, information is recorded on the information-recording surface of the hard disk D with a recording width of the track width T. Whereas, as shown in FIG. 5B, when the tilt angle is not zero, the recording width increases from the track width T to the sum of a width $T_1$ and $\Delta T$, and a recording leakage (fringing) occurs.

Figure 6:
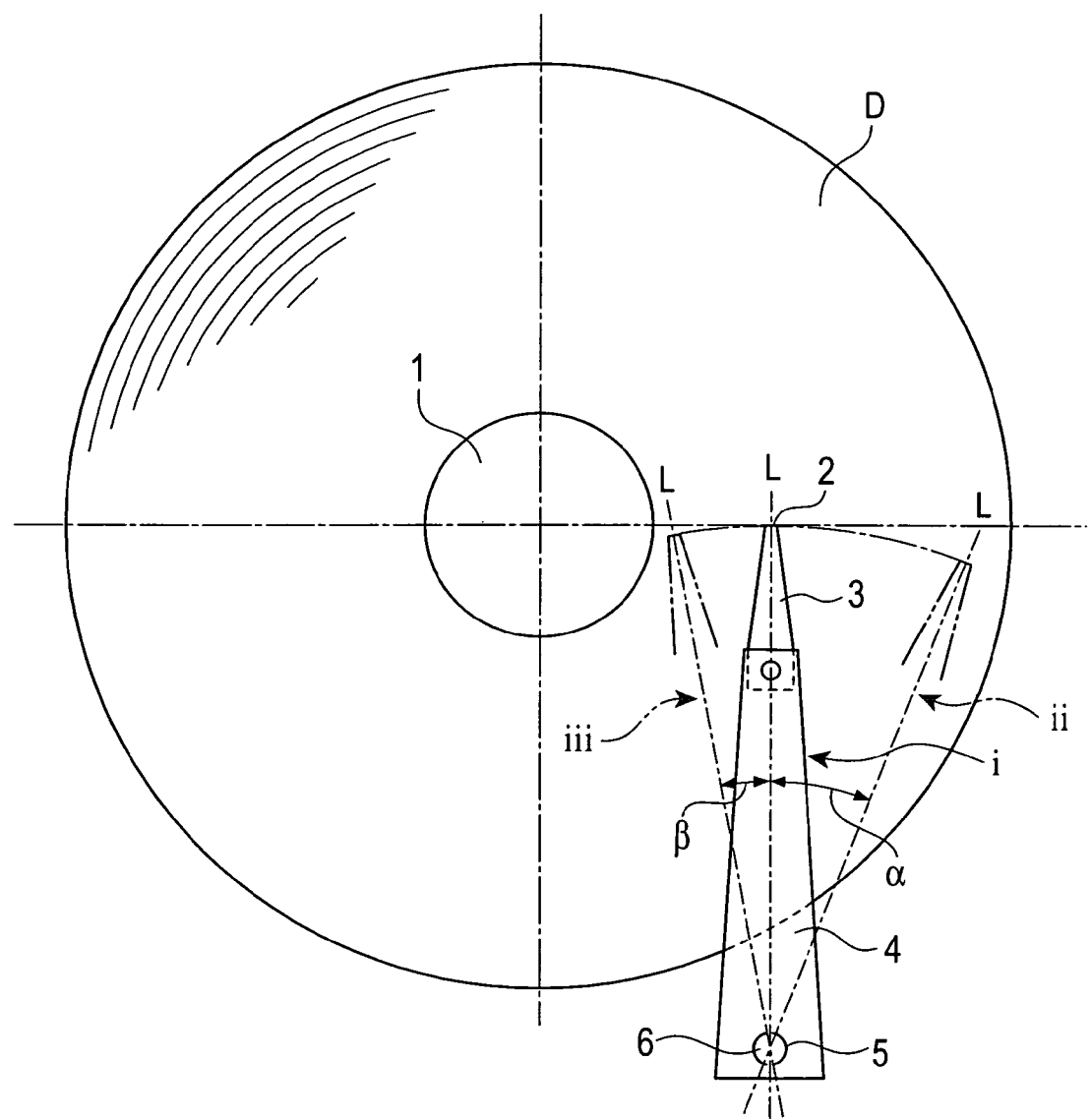
FIG. 6 is a plan view illustrating a principal portion of a hard-disk apparatus according to a related art.

As shown in FIG. 6, the hard-disk apparatus according to the related art has the fringing problem, however, the head-driving device 20 according to the embodiment of the present invention can correct the tilt angle.

As shown in FIG. 1, the pivoting arm 21 rotates around the supporting shaft 22 by the actuator 23. A reference position (I) of the pivoting arm 21 when the operational reference line L of the magnetic head 40 is oriented substantially along the tangential direction to the recording track on the information-recording surface of the hard disk D is illustrated with solid lines.

When the pivoting arm 21 rotates clockwise by an angle $\alpha$ from the reference position (I) to an outer circumferential position (II), the magnetic head 40 reaches the outermost circumferential position in the recording area of the information-recording surface. When the pivoting arm 21 rotates counterclockwise by an angle $\beta$ from the reference position (I) to an inner circumferential position (III), the magnetic head 40 reaches the innermost circumferential position in the recording area of the information-recording surface.

When the pivoting arm 21 reaches the outer circumferential position (II), the intermediate hole 21c retaining the supporting shaft 32 of the directing rod 31 moves clockwise by an angle $\alpha$ from the reference position (I). Accordingly, the directing rod 31 rotates clockwise from the reference position (I), the beam rod 26 thus rotates counterclockwise, and the head beam 24 rotates counterclockwise around the link shaft 25 and the front hole 21b. As a result, the operational reference line L of the magnetic head 40 is oriented substantially along the tangential direction U to the recording track on the information-recording surface to eliminate the tilt angle.

At this time, the torsion spring 27 continuously urges the head beam 24 and the beam rod 26 that is a part of this head beam 24 in the counterclockwise direction. This urging force is applied to the directing rod 31 from the second side 26c of the beam rod 26 through the slidable projection 33a, and the side 34a of the second arm 34 of the directing rod 31 is pressed against the fixed supporting point 36. Accordingly, the head beam 24 is retained without backlash, and the magnetic head 40 also stably opposes the information-recording surface of the hard disk D.

When the pivoting arm 21 reaches the inner circumferential position (III), the supporting shaft 32 and the intermediate hole 21c moves counterclockwise from the reference position (I). Accordingly, the directing rod 31 rotates counterclockwise around the supporting shaft 32, and thus the head beam 24 rotates clockwise around the link shaft 25. As a result, the operational reference line L of the magnetic head 40 is oriented substantially along the tangential direction U to the recording track on the information-recording surface to eliminate the tilt angle.

Also at this time, since the torsion spring 27 continuously urges the beam rod 26 in the counterclockwise direction, the head beam 24 is retained and the magnetic head 40 opposes the information-recording surface of the hard disk D without backlash.

In the above-described embodiment, the beam rod 26 and the slidable projection 33a are simply in contact with each other, and the second arm 34 of the directing rod 31 is also simply in contact with the fixed supporting point 36. Therefore, the structures of the beam rod 26 and the directing rod 31 can be simplified and can be easily reduced in size. Moreover, since the torsion spring 27 continuously urges the above-described contact portions, the head beam 24 is stabilized wherever the pivoting arm 21 is located. Besides, in FIG. 1, a slidable projection may be formed on the beam rod 26, and a projection functioning as a fixed supporting point may be formed on the directing rod 31.

In the present invention, a long hole may be formed in one of the beam rod 26 and the directing rod 31, and a slidable projection that slides inside the long hole may be formed on the other. Similarly, a long hole may be formed in one of the directing rod 31 and the fixed rod 35, and a slidable projection that slides inside the long hole may be formed on the other.

In the embodiment shown in FIG. 1, since the fixed supporting point 36 is disposed at a midpoint between the base hole 21a and the intermediate hole 21c of the pivoting arm 21, the distance between the fixed supporting point 36 and the intermediate hole 21c and the distance between the intermediate hole 21c and the slidable projection 33a can be reduced, and thus the length of the directing rod 31 can be reduced. Reducing the length of the directing rod 31 can prevent the beam rod 26 and the directing rod 31 from significantly sticking out of the pivoting arm 21 when the pivoting arm 21 rotates as shown in FIG. 1, and can reduce the size of the head-driving device 20.

Figure 3:
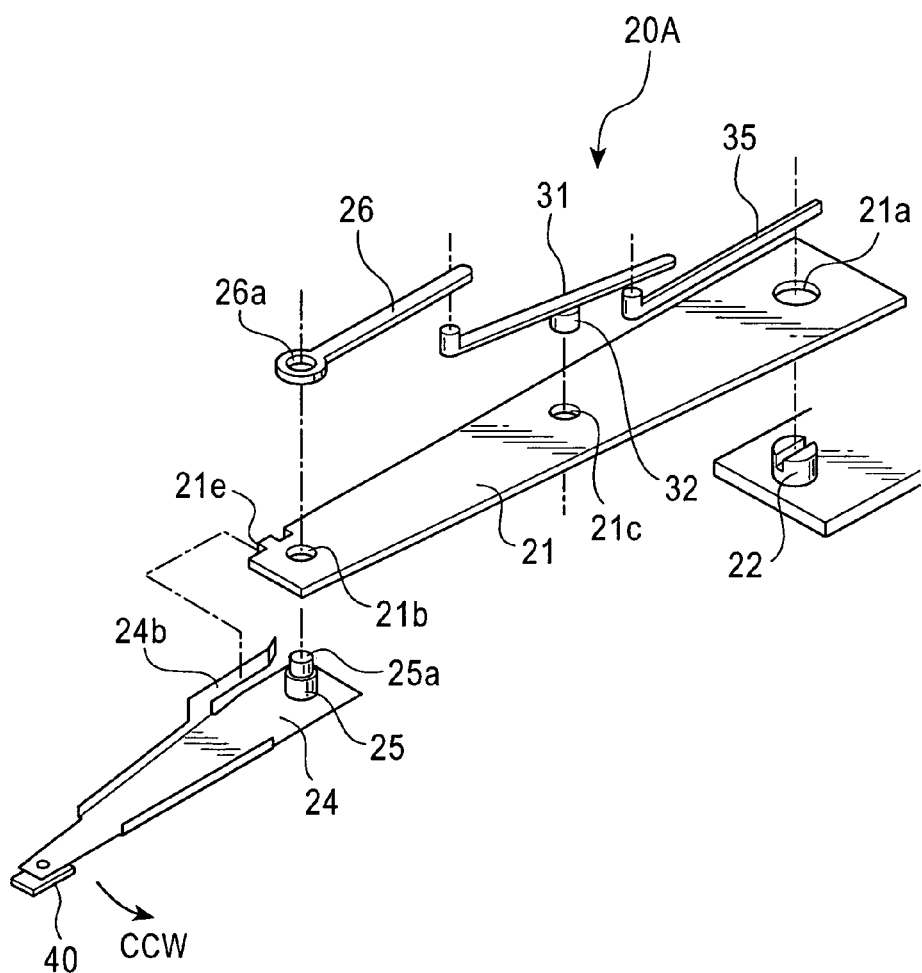
FIG. 3 is an exploded perspective view illustrating a modification of the head-driving device.

The head-driving device 20A shown in FIG. 3 is a modification of the head-driving device 20 shown in FIG. 2. The basic structure of the head-driving device 20A is the same as the head-driving device 20, however, the urging members have different structures.

The head-driving device 20A shown in FIG. 3 includes a plate spring 24b that is a part of the head beam 24 instead of the torsion spring 27. Alternatively, a separate plate spring 24b may be attached to the head beam 24. Meanwhile, a contact portion 21e to be brought into contact with a folded portion of the plate spring 24b is formed at the front portion of the pivoting arm 21. The plate spring 24b is fixed at the outer surface of the contact portion 21e, and the head beam 24 is continuously urged in the counterclockwise direction by the elastic force of the plate spring 24b.

Since the head-driving device 20A shown in FIG. 3 does not include the torsion spring 27 shown in FIG. 2, the number of parts and the size of the device can be reduced.

The present invention is not limited to hard-disk apparatuses, and is applicable to any other recording apparatuses that need to orient the operational reference line L of the head along the tangential direction U.

It is therefore intended that the foregoing detailed description be regarded as illustrative rather than limiting, and that it be understood that it is the following claims, including all equivalents, that are intended to define the spirit and scope of this invention.

What is claimed is:

1. A disk apparatus comprising:
    rotating means for rotating a disk;
    a head opposing an information-recording surface of the disk;
    an arm pivoting around a base portion to move the head between an inner circumference of the disk and an outer circumference of the disk;
    an actuator operating the arm;
    a rotatable head beam rotating in a first plane supporting the head and retained at a front portion of the arm;
    an urging member that applies an urging force to the head beam in one direction; and
    a directing member disposed above the arm and rotating in a second plane around an intermediate portion disposed at a midpoint between a base portion and a front portion, wherein
    the second plane is substantially parallel to the first plane;
    the directing member contains a first segment extending from the intermediate portion toward the head, and a second segment extending from the intermediate portion toward the base portion;
    the urging force is applied to the first segment through the head beam to rotate the directing member in an opposite direction to the head beam; and
    the second segment is sustained by a fixed supporting point other than the arm.

2. The disk apparatus according to claim 1, wherein the urging force is continuously applied to the directing member through the head beam when the arm rotates both clockwise and counterclockwise from a reference position in which an operational reference line of the head is oriented along a tangential direction to a track of the information-recording surface of the disk.

3. The disk apparatus according to claim 1, wherein the head beam is slidably in contact with the first segment of the directing member; and
    the second segment of the directing member is slidably in contact with the fixed supporting point.

4. The disk apparatus according to claim 1, wherein the disk is a magnetic disk; and
    the head comprises a magnetic pole and a return path for perpendicular magnetic recording on the magnetic disk.

5. A disk apparatus comprising:
    a head;
    a rotatable head beam supporting the head; an arm retaining the head beam;
    a non-moving supporting shaft around which the arm pivots; and
    means for maintaining a constant orientation of the head independent of a position of the arm, wherein the means for maintaining further comprises a multi-part suspension where an orientation of a portion of the multi-part suspension is maintained substantially constant relative to the head beam.

6. A disk apparatus comprising:
a head;
a rotatable head beam supporting the head;
an arm pivotable around a base portion, a front portion of the arm retaining the head beam;
a set of rods disposed above the arm, a first of the rods fixed at the base portion of the arm, a second of rods rotatable and disposed over an intermediate portion of the arm, and a third of the rods fixed to the head beam at the front portion of the arm, the rods disposed such that the arm and second rod rotate in a first direction while the third rod rotates in a second direction in opposition to the rotation of the arm and second rod; and
a resilient member that applies a force to the second rod such that when the arm rotates backlash to the head beam is minimized.

7. The disk apparatus according to claim 6, wherein the resilient member applies force in only one direction.

8. The disk apparatus according to claim 6, wherein the resilient member applies force to the second rod through the head beam.

9. The disk apparatus according to claim 6, wherein the set of rods contains only three rods.

10. The disk apparatus according to claim 6, wherein at least one the rods contains a projection that contacts and slides along another of the rods as the second and third rods rotate.

11. The disk apparatus according to claim 6, wherein the second rod contains a projection around which the second rod rotates, the projection inserted through a hole in the arm.

12. The disk apparatus according to claim 11, wherein the projection is disposed at a midpoint of the second rod.

13. The disk apparatus according to claim 6, wherein the second rod contains a projection, the projection is inserted through a hole in the arm, and the second rod rotates around the hole.

14. The disk apparatus according to claim 6, wherein the base portion of the arm contains a hole through which a projection extends, and the first rod is fixed by the projection.

15. The disk apparatus according to claim 14, wherein the projection contains a groove that retains the first rod.

16. The disk apparatus according to claim 6, wherein the first rod contacts the second rod, and the second rod contacts the third rod.

17. The disk apparatus according to claim 6, wherein the front portion of the arm contains a hole through which a projection of the head beam extends, the projection and the third rod are fixed together.

18. The disk apparatus according to claim 17, wherein the third rod contains a hole through which the projection extends.

19. The disk apparatus according to claim 18, wherein the resilient member comprises a coil through which the projection extends, an extension from a first end of the coil contacts the arm and an extension from a second end of the coil contacts one side of the third rod.

20. The disk apparatus according to claim 6, wherein the resilient member comprises a plate spring.

21. The disk apparatus according to claim 20, wherein a contact portion is formed in the front portion of the arm, and the plate spring contacts the contact portion.

22. The disk apparatus according to claim 20, wherein the plate spring is integral with the head beam.

23. The disk apparatus according to claim 20, wherein the plate spring is attached to the head beam.

24. The disk apparatus according to claim 6, wherein an orientation of the head is maintained independent of a position of the arm.

25. The disk apparatus according to claim 24, wherein the rotation of the third rod substantially compensates for the rotation of the arm such that the orientation of the head is maintained.

26. A disk apparatus comprising:
a head;
a rotatable head beam supporting the head;
an arm pivotable around a base portion, a front portion of the arm retaining the head beam; and
a multi-part suspension disposed above the arm that compensates for pivoting of the arm such that an orientation of the head is maintained substantially constant independent of a position of the arm while backlash to the head beam is minimized when the arm rotates, wherein an orientation of a portion of the multi-part suspension is maintained substantially constant relative to the head beam.

27. The disk apparatus according to claim 26, further comprising a resilient member that applies force to a first portion of the multi-part suspension.

28. The disk apparatus according to claim 26, wherein a first portion of the multi-part suspension contacts and slides a second portion of the multi-part suspension as the arm rotates.

29. The disk apparatus according to claim 26, wherein a first portion of the multi-part suspension contains a first projection around which the first portion rotates, and the first projection is inserted through a hole in the arm.

30. The disk apparatus according to claim 29, wherein a second portion of the multi-part suspension contains a second projection that fixes a position of the second portion, and the second projection is inserted through a hole in the base portion of the arm.

31. The disk apparatus according to claim 30, wherein the front portion of the arm contains a hole through which a projection of the head beam extends and the projection of the head beam and a third portion of the multi-part suspension are fixed together.

32. The disk apparatus according to claim 31, wherein the third portion a hole through which the projection of the head beam extends.

33. The disk apparatus according to claim 32, further comprising a coil through which the projection of the head beam extends, an extension from a first end of the coil contacts the arm and an extension from a second end of the coil contacts one side of the multi-part suspension.

34. The disk apparatus according to claim 32, further comprising a plate spring that contacts one side of the arm.

* * * * *

UNITED STATES PATENT AND TRADEMARK OFFICE
CERTIFICATE OF CORRECTION

| | | |
|---|---|---|
| PATENT NO. | : 7,372,671 B2 | Page 1 of 1 |
| APPLICATION NO. | : 11/021233 | |
| DATED | : May 13, 2008 | |
| INVENTOR(S) | : Hisayuki Yazawa | |

It is certified that error appears in the above-identified patent and that said Letters Patent is hereby corrected as shown below:

<u>In the Claims</u>

In column 9, in claim 10, line 2, before "the rods contains a" insert --of--.

In column 10, in claim 32, line 2, after "third portion" insert --contains--.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,372,671 B2 | Page 1 of 1 |
| APPLICATION NO. | : 11/021233 | |
| DATED | : May 13, 2008 | |
| INVENTOR(S) | : Hisayuki Yazawa | |

It is certified that error appears in the above-identified patent and that said Letters Patent is hereby corrected as shown below:

In the Claims

In column 9, in claim 10, line 28, before "the rods contains a" insert --of--.

In column 10, in claim 32, line 52, after "third portion" insert --contains--.

This certificate supersedes the Certificate of Correction issued April 14, 2009.

Signed and Sealed this

Fifth Day of May, 2009

JOHN DOLL
*Acting Director of the United States Patent and Trademark Office*